(No Model.)
E. R. KNOWLES.
ALLOY FOR SECONDARY BATTERY PLATES.
No. 408,182. Patented July 30, 1889.
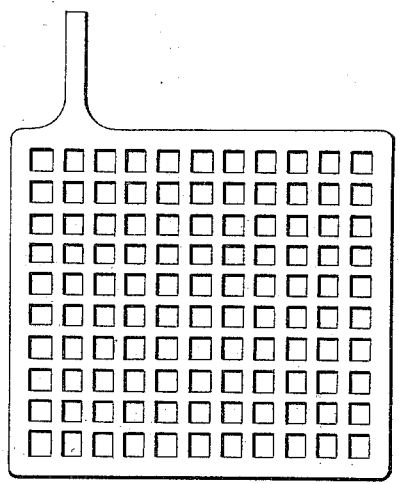
WITNESSES:
INVENTOR
Edward R. Knowles.
BY
ATTORNEY

United States Patent Office.

EDWARD R. KNOWLES, OF BROOKLYN, NEW YORK, ASSIGNOR, BY MESNE ASSIGNMENTS, TO THE MUTUAL ELECTRIC MANUFACTURING COMPANY, OF NEW YORK.

ALLOY FOR SECONDARY-BATTERY PLATES.

SPECIFICATION forming part of Letters Patent No. 408,182, dated July 30, 1889.

Application filed September 29, 1888. Serial No. 285,390. (No specimens.)

*To all whom it may concern:*

Be it known that I, EDWARD R. KNOWLES, a citizen of the United States, residing at Brooklyn, in the county of Kings and State of New York, have invented a certain new and useful Improvement in Alloys for Secondary-Battery Plates, of which the following is a specification.

The invention relates to secondary batteries, with special reference to the supporting plates or electrodes of the same.

The objects of the invention are to provide a plate which shall be of cheap construction and at the same time be stiff, strong, and non-oxidizable when in use.

To these ends the invention consists in forming the plates of an alloy of lead, tin, and antimony, in about the proportions hereinafter set forth.

The drawing represents a side view of a secondary-battery plate.

In my experiments I have secured the best results from an allow consisting of eighty-two parts lead, sixteen parts tin, and two parts antimony. The tin renders the alloy non-oxidizable and the antimony stiffens it.

Having now set forth my invention, I claim—

1. In a battery, a plate composed of an alloy of lead, tin, and antimony, substantially as set forth.

2. A plate for electric batteries, composed of an alloy of about eighty-two parts lead, sixteen parts tin, and two parts antimony.

In witness whereof I have hereunto signed my name in the presence of two subscribing witnesses.

EDWARD R. KNOWLES.

Witnesses:
WM. A. ROSENBAUM,
FRANK C. GRUEN.